Patented Feb. 22, 1938

2,108,897

UNITED STATES PATENT OFFICE 2,108,897

PROCESS OF MAKING FOOD PRODUCTS

Gaston J. Ley, John H. Payne, and George Akau, Honolulu, Territory of Hawaii, dedicated to the free use of the People of the United States No Drawing. Application January 14, 1937, Serial No. 120,505

1 Claim. (Cl. 99—93)

(Granted under the act of March 3, 1883, as amended April 30, 1928; 370 O. G. 757)

This application is made under the act of March 3, 1883, as amended by the act of April 30, 1928, and the invention herein described and claimed may be manufactured and used by or for the Government for governmental purposes without the payment to us of any royalty thereon.

We hereby dedicate the invention herein described to the free use of the People of the United States, to take effect on the granting of a patent to us.

Our invention consists of a process for permanently altering the properties of taro flour or meal so that these substances will no longer assume a highly viscous consistency on the addition of liquids, but will remain when so treated as discreet particles held together as a slightly gelatinous mass.

In the manufacture of taro flour or meal, the taro must first be cooked, peeled and dried. The dried material is then ground, and brought to the desired fineness by sifting through a sifter of suitable mesh. On the addition of hot water, this material again assumes the same physical characteristics as the original taro paste. Paste made from cooked taro is highly viscous and this viscosity persists regardless of the amount of water or other liquid added. The dried material, with the addition of liquid, likewise produces a highly viscous paste. This characteristic persists regardless of the size of the dry particles. Cereals or puddings made from wheat or corn may retain a certain granular consistency upon cooking, and somewhat gelatinous but not highly viscous or sticky. It was found impossible to produce substances with this characteristic from taro meal made as described above.

Dry taro meal made as described above undergoes changes when heated or mildly roasted as described specifically in the next paragraph. On the addition of hot water or other hot liquid to the meal thus treated, there is no longer a reversion of this material to its original highly viscous state. In all cases the material retains its granular structure, and the mush or pudding thus produced has exactly the same physical characteristics as substances similarly made from wheat or corn meal.

Dry taro meal produced as described above is heated in a bake oven as follows: The material is placed on trays, heated for approximately 30 minutes at 250° F., then for approximately 15 minutes at 300° F., and finally for from 5 to 15 minutes at 350° F. The amount of heating required in this final temperature is determined by observation of the change in color of the material. A more uniform product is obtained if the material is agitated either continuously or intermittently during the roasting process. The material thus produced is utilized as any one of the following products.

*a. Mush.*—On the addition of hot water, with or without additional cooking, a granular mush results, free from any noticeable viscosity, and similar in its physical properties to a similar mush made from wheat or corn meal.

*b. Pudding preparation.*—This same product is used as a base for various pudding preparations, which can be prepared by the addition to the roasted meal of sugar, salt, powdered milk, and flavoring such as chocolate or vanilla. On the addition of hot water or milk, in the proportions of one of the solid mixture to 4 or 5 of liquid, and allowing the same to cool, a pudding results in which the individual taro particles remain discreet and slightly gelatinous. Without the roasting operation, similar preparations revert to a viscous colloidal mass in which no individual particles of the original meal are discernible.

*c. Muffins, waffles, etc.*—The product is prepared as an adjunct to the production of muffins, waffles and other baked products. This product is used to the extent of from 10 to 50 percent of the total combined flour or meal.

Having thus described our invention, what we claim for Letters Patent is:

The method for producing taro meal so that it will not revert to an amorphous viscous mass when hot liquid is added, comprising subjecting dry taro meal to the action of heat at substantially 250° F. for approximately 30 minutes, thence raising the temperature to approximately 300° F. for approximately 15 minutes, thence raising the temperature to approximately 350° F. for a period ranging from 5 to 15 minutes, the while agitating the mass.

GASTON J. LEY.
JOHN H. PAYNE.
GEORGE AKAU.